(12) United States Patent
Nishimura et al.

(10) Patent No.: US 11,944,997 B2
(45) Date of Patent: Apr. 2, 2024

(54) SURFACE DECORATION STRUCTURE PROVIDED WITH SILVER MIRROR FILM LAYER AND METHOD FOR FORMING SAME

(71) Applicant: SHIMANO INC., Sakai (JP)

(72) Inventors: Yasushi Nishimura, Osaka (JP); Akio Nagai, Osaka (JP); Wataru Yamauchi, Osaka (JP); Kazumi Yasuda, Okayama (JP); Hiroyuki Arimoto, Okayama (JP); Mai Ooe, Okayama (JP)

(73) Assignee: SHIMANO INC., Osaka (JP)

( * ) Notice: Subject to any disclaimer, the term of this patent is extended or adjusted under 35 U.S.C. 154(b) by 562 days.

(21) Appl. No.: 16/478,849

(22) PCT Filed: Nov. 24, 2017

(86) PCT No.: PCT/JP2017/042140
§ 371 (c)(1),
(2) Date: Sep. 25, 2019

(87) PCT Pub. No.: WO2018/135132
PCT Pub. Date: Jul. 26, 2018

(65) Prior Publication Data
US 2020/0009606 A1    Jan. 9, 2020

(30) Foreign Application Priority Data

Jan. 18, 2017 (JP) .................................. 2017-006966
Nov. 8, 2017 (JP) .................................. 2017-215329

(51) Int. Cl.
*B05D 5/06* (2006.01)
*B05D 1/02* (2006.01)
(Continued)

(52) U.S. Cl.
CPC ............... *B05D 5/067* (2013.01); *B05D 1/02* (2013.01); *B05D 1/38* (2013.01); *C09D 5/08* (2013.01);
(Continued)

(58) Field of Classification Search
CPC ... C09D 7/20; C09D 7/48; C09D 5/08; C09D 7/67; C09D 5/004; C09D 5/24;
(Continued)

(56) References Cited

U.S. PATENT DOCUMENTS 5,741,901 A * 4/1998 Cook ........................ C08B 3/16
536/76
6,475,609 B1 * 11/2002 Whitney ................. A61P 17/04
428/407

(Continued)

FOREIGN PATENT DOCUMENTS

EP    2584384 A1    4/2013
EP    2587281 A1    5/2013
(Continued)

OTHER PUBLICATIONS

Machine translation of KR101465887B1, published Nov. 2014. (Year: 2014).*

(Continued)

*Primary Examiner* — Monique R Jackson
(74) *Attorney, Agent, or Firm* — HAUPTMAN HAM, LLP (57) ABSTRACT

A surface decoration structure includes an undercoat film, a silver mirror film layer, and a topcoat film formed on a surface of a substrate. The silver mirror film layer includes a film of stacked nanometer-sized silver particles having surfaces coated with a polymer dispersing agent, and the topcoat film includes, as a solvent, at least one member selected from the group consisting of an aliphatic hydrocar- (Continued)

bon compound, an aliphatic hydrocarbon compound solution including 10% by mass or less of an aromatic compound, and diisobutyl ketone. The undercoat film and/or the topcoat film may include a corrosion inhibitor. The silver mirror film layer may further include a corrosion inhibitor. The surface decoration structure includes the silver mirror film layer with improved luster and corrosion resistance.

7 Claims, 3 Drawing Sheets

(51) Int. Cl.
    *B05D 1/38*     (2006.01)
    *B05D 7/00*     (2006.01)
    *C09D 5/08*     (2006.01)
    *C09D 7/20*     (2018.01)
    *C09D 7/48*     (2018.01)
    *B22F 1/0545*     (2022.01)

(52) U.S. Cl.
    CPC ............... *C09D 7/20* (2018.01); *C09D 7/48* (2018.01); *B05D 5/068* (2013.01); *B05D 7/57* (2013.01); *B22F 1/0545* (2022.01)

(58) Field of Classification Search
    CPC ............... C09D 5/1693; C09D 5/38; C08K 2003/0806; B05D 1/02; B05D 1/38; B05D 5/067; B05D 5/068; B05D 7/57; B22F 1/0545
    See application file for complete search history.

(56) References Cited

U.S. PATENT DOCUMENTS

| | | | | |
|---|---|---|---|---|
| 2003/0091602 | A1* | 5/2003 | Witteler | A61K 8/00 424/401 |
| 2004/0210056 | A1* | 10/2004 | Wood | C07D 211/94 546/223 |
| 2006/0057363 | A1* | 3/2006 | Takahashi | B05D 5/068 428/323 |
| 2009/0214447 | A1* | 8/2009 | Jennings | A61K 8/8129 424/59 |
| 2009/0220689 | A1* | 9/2009 | Bahls | C23F 11/173 427/404 |
| 2009/0220696 | A1 | 9/2009 | Chung et al. | |
| 2013/0029034 | A1 | 1/2013 | Liu et al. | |
| 2013/0088774 | A1 | 4/2013 | Mochizuki | |
| 2014/0133028 | A1* | 5/2014 | Kumagai | B32B 27/08 359/507 |

FOREIGN PATENT DOCUMENTS

| | | | | |
|---|---|---|---|---|
| EP | 2803430 | A1 | 11/2014 | |
| JP | 2007-169685 | A | 7/2007 | |
| JP | 20122907 | A | 1/2012 | |
| JP | 2012048006 | A * | 3/2012 | |
| JP | 2012-96225 | A * | 5/2012 | |
| JP | 2012-96225 | A | 5/2012 | |
| JP | 2012-144796 | A | 8/2012 | |
| JP | 2012143955 | A | 8/2012 | |
| JP | 2013-28864 | A | 2/2013 | |
| JP | 2013-159649 | A | 8/2013 | |
| JP | WO2011158677 | A1 | 8/2013 | |
| JP | 2013-177596 | A | 9/2013 | |
| JP | 5610359 | B2 | 10/2014 | |
| JP | 5950427 | B1 | 7/2016 | |
| JP | 20172219 | A | 1/2017 | |
| KR | 101465887 | B1 * | 11/2014 | C23C 26/00 |
| WO | 2011/162153 | A1 | 12/2011 | |

OTHER PUBLICATIONS

Machine translation of JP2012-096225A, published May 2012. (Year: 2012).*
Machine translation of JP5950427B1, published Jul. 13, 2016, by Google Patents. (Year: 2016).*
Ciba® Tinuvin® 234 Technical Data Sheet, retrieved from U.S. Pat. No. 8,759,428 printed Jun. 2014. (Year: 2014).*
BASF Tinuvin® 234 Technical Data Sheet, Aug. 2010. (Year: 2010).*
BASF "Coatings that stay looking good Tinuvin®, Chimassorb®, Lignostab®, Irganox®, Irgafos®, Irgaguard®, Irgarol®, Tinopal®", Mar. 2011, retrieved on Aug. 12, 2023 from https://www.btc-europe.com/fileadmin/user_upload/Downloads/Brochures-Information/Coatings/Tinuvin_Chimassorb_Lignostab_EN.pdf . (Year: 2011).*
Machine translation of JP2012-048006A, published Mar. 2012, Powered by EPO and Google. (Year: 2012).*
Extended European search report in EP application No. 17893420.4, dated Jun. 9, 2021, 15pp.
Office Action in CN application No. 201780088616.0, dated Feb. 22, 2021, 17pp.
International Search Report in PCT/JP2017/042140, dated Feb. 6, 2018, 4pp.
Office Action in KR application No. 10-2019-7023831, dated May 12, 2022, 24pp.

* cited by examiner

SURFACE DECORATION STRUCTURE PROVIDED WITH SILVER MIRROR FILM LAYER AND METHOD FOR FORMING SAME

RELATED APPLICATIONS

The present application is a National Phase of International Application No. PCT/JP2017/042140 filed Nov. 24, 2017, which claims priority to Japanese Application Nos. 2017-006966, filed Jan. 18, 2017, and 2017-215329, filed Nov. 8, 2017.

FIELD

The present invention relates to a surface decoration structure including a silver mirror film layer with good mirror luster and a method of forming the surface decoration structure, and more particularly, to a surface decoration structure including a silver mirror film layer resistant to discoloration and peeling produced by painting, and a method of forming the surface decoration structure.

BACKGROUND

Silver (Ag) has high optical reflectivity in the visible region and also has fine metallic luster. A silver mirror film layer formed on a substrate of resin or metal shows fine metallic luster, and has potential use in automobile interior or exterior parts, bicycles, fishing tackle, mobile phones, laptop computers, cosmetic containers, and other items. For example, automobiles are painted to protect their main materials (mostly, steel plates and plastic plates) and improve their appearance. Finely painted cars look better and provide higher product values than other cars with the same shapes and performance. Metallic paint on cars is popular because metallic paint has a luxurious metallic texture and provides different hues to the appearance of a car as viewed at different angles, allowing the car shape to produce a distinctive impression. Metallic paint on a car often contains aluminum flakes as bright materials. Such metallic paint is also used for other products. Metallic paint on expensive products may contain silver as bright materials or in a mirror surface film.

Silver mirror plating based on a silver mirror reaction with an ammoniacal silver nitrate solution has been a well-known method of forming a silver mirror film layer on a substrate. The silver mirror plating with an ammoniacal silver nitrate solution may cause chalking (or whitening) specific to plating, cracks, an uneven coating thickness, or an aggregation variance in silver nanoparticles forming the silver mirror plated surface, which may cause uneven coloring (metallic luster) on the silver mirror plated surface. Additionally, such silver mirror plating may cover unintended parts, thus causing a high defect rate or causing easy peeling of the silver mirror plated surface from the substrate surface.

To solve such issues with the silver mirror plating using the ammoniacal silver nitrate solution, a silver compound complex may be used with an amine compound or an ammonium carbamate compound coordinated in place of ammonium. For example, Patent Literature 1 (Japanese Patent No. 5610359) describes a composition liquid for forming a silver mirror film layer, a method of producing a composition liquid for forming a silver mirror film layer, and a method of forming a silver mirror film coat surface. The composition liquid for forming a silver mirror film layer includes an alcoholic solvent containing a first complex in which an ammonium carbamate compound coordinates with the silver atom of a silver compound, a second complex in which an amine compound coordinates with the silver atom of a silver compound, and a reducing agent. The first complex and the second complex are mixed at Ag molar ratios from 6:4 to 8:2.

Another known method uses silver nanoparticles prepared and then applied to form a silver mirror film layer. For example, Patent Literature 2 (Japanese Unexamined Patent Application Publication No. 2012-144796) below describes a method of forming a silver conductive layer by mixing a silver compound, an organic stabilizer including an organic amine compound or an organic amine compound and an organic carboxylic acid compound, and an organic solvent, and adding a powdered monoacylhydrazide compound as a reducing agent to the mixture. In a heterogeneous system, the silver compound is reacted with the monoacylhydrazide compound to form silver nanoparticles. The resultant silver nanoparticles are separated, washed, dried, and then dispersed in an appropriate organic solvent to prepare silver ink. The silver ink is then applied to the surface of a substrate, which is then baked at 100 to 180° C. to form a silver conductive layer.

Patent Literature 3 (Japanese Patent No. 5950427) below also describes a method of forming a silver mirror film layer using an alcohol solution. The solution is prepared by dispersing a polymer dispersing agent with an acid value of 150 or less and at least one silver compound selected from silver oxide and silver carbonate in an alcohol solvent. The polymer dispersing agent has a styrene-maleic anhydride resin structure, and the maleic anhydride is partially modified with hydroxyl-terminated polyalkylene glycol or amino-terminated polyalkylene glycol. The alcohol solution is irradiated with an ultrasonic wave to prepare a composition liquid for forming a silver mirror film layer as an alcohol solution in which silver nanoparticles are dispersed. The composition liquid for forming a silver mirror film layer is spray-painted on the surface of a substrate, which is then dried at room temperature to form a silver mirror film layer.

CITATION LIST

Patent Literature

Patent Literature 1: Japanese Patent No. 5610359
Patent Literature 2: Japanese Unexamined Patent Application Publication No. 2012-144796
Patent Literature 3: Japanese Patent No. 5950427

BRIEF SUMMARY

Technical Problem

The method of forming a silver mirror film layer described in Patent Literature 1 forms a silver mirror film layer on the surface of a substrate by applying a composition liquid for forming a silver mirror film layer and heating the liquid to 77 to 90° C. The method of forming a silver conductive layer described in Patent Literature 2 forms a silver conductive layer with good electroconductivity by baking a dispersing agent containing silver nanoparticles at relatively low temperatures of 100 to 180° C. The method of forming a silver mirror film layer described in Patent Literature 3 forms a silver mirror film layer on the surface of a substrate by spray-painting the surface of the substrate with a silver mirror film coating liquid that is an alcohol solution containing dispersed silver nanoparticles, and simply drying the liquid at room temperature.

The method described in Patent Literature 1 forms a silver mirror film layer by baking to 77 to 90° C., whereas the method described in Patent Literature 2 forms a silver conductive layer by baking at 100 to 180° C. However, the method described in Patent Literature 3 forms a silver mirror film layer by simply spray-painting the surface of a substrate with a composition liquid for forming a silver mirror film layer and drying the liquid at room temperature. This method is characterized as least by its processing temperature, compared with the methods described in Patent Literatures 1 and 2.

Among them, the method of forming a silver mirror film layer described in Patent Literature 1 uses the composition liquid for forming a silver mirror film layer containing the amine compound and the ammonium carbamate compound liberated from the silver atoms, and also the reducing agent. The formed silver mirror film layer thus includes these compounds and byproducts. The compounds and byproducts, although being noncorrosive, may affect the properties of the formed silver mirror film layer.

In contrast, the methods of forming a silver mirror film layer described in Patent Literatures 2 and 3 each use the composition liquid for forming a silver mirror film layer containing no components other than the solvent, the nanometer-sized silver particles, and the polymer dispersing agent. The methods thus have no corrosive components in the formed silver mirror film layer, eliminate the processing for removing harmful byproducts after the silver mirror film layer forms, and thus allow easy formation of a silver mirror film layer on the surfaces of various substrates. In particular, the method of forming a silver conductive layer described in Patent Literature 3 eliminates the process of separating, washing, drying, and then dispersing the generated nanometer-sized silver particles in an organic solvent, unlike the method of forming a silver mirror film layer described in Patent Literature 2.

After their experiments in forming silver mirror film layers on the surfaces of various substrates to increase the potential of the method described in Patent Literature 3, the inventors have noticed that the luster of a silver mirror film layer may decrease during or after topcoating on the surface of the silver mirror film layer depending on the type of the solvent used for the topcoat paint, and also the silver mirror film layer may undergo discoloration or peeling in various corrosion resistance tests after the topcoat film forms. These may largely degrade the product quality of outdoor-use products, such as fishing rods and bicycle parts, that may be used under severer conditions than indoor-use products.

In response to the above issues, one or more aspects of the present invention are directed to a surface decoration structure including a topcoat film, a silver mirror film layer, and an undercoat film formed on surfaces of various substrates for which the luster and corrosion resistance of the silver mirror film layer are improved by changing the composition of the topcoat paint, and a method of forming the surface decoration structure.

Solution to Problem

A surface decoration structure according to a first aspect of the present invention includes an undercoat film, a silver mirror film layer, and a topcoat film formed on a surface of a substrate. The silver mirror film layer includes a film of stacked nanometer-sized silver particles, and the topcoat film includes, as a solvent, at least one member selected from the group consisting of an aliphatic hydrocarbon compound, an aliphatic hydrocarbon compound solution including 10% by mass or less of an aromatic compound, and diisobutyl ketone.

The surface decoration structure according to the first aspect includes the topcoat film that eliminates unevenness in the brightness of the silver mirror film layer to provide good brightness. Although diisobutyl ketone is not an aliphatic hydrocarbon compound, this compound has four methyl groups arranged three-dimensionally surrounding the ketone group, with their steric hindrance eliminating the effect of the polarity of the ketone group on the surfaces of the silver nanoparticles. Thus, diisobutyl ketone has substantially the same function as an aliphatic hydrocarbon compound. Although an aromatic hydrocarbon compound can adversely affect the brightness of the silver mirror film layer, the brightness is not affected when the amount of an aromatic hydrocarbon compound is 10% by mass or less in an aliphatic hydrocarbon compound.

A surface decoration structure according to a second aspect of the present invention is the surface decoration structure according to the first aspect in which the aliphatic hydrocarbon compound includes at least one member selected from the group consisting of n-hexane, n-heptane, cyclohexane, and ethylcyclohexane.

The surface decoration structure according to the second aspect further improves the functional effects of the first aspect.

A surface decoration structure according to a third aspect of the present invention is the surface decoration structure according to the first aspect in which the undercoat film is of the same type as the topcoat film.

The surface decoration structure according to the third aspect includes the undercoat film and the topcoat film of the same type, and thus produces the functional effects between the topcoat film and the silver mirror film layer, and also between the undercoat film and the silver mirror film layer, and enhances the above effects.

A surface decoration structure according to a fourth aspect of the present invention is the surface decoration structure according to the first aspect in which the topcoat film and/or the undercoat film includes an ultraviolet absorber and a light stabilizer selected from any of combinations (1) to (3):

(1) a benzotriazole compound and a benzoate compound,
(2) a benzotriazole compound and a hindered amine compound, and
(3) a triazine compound and a hindered amine compound.

In the surface decoration structure according to the fourth aspect, at least the topcoat film includes an ultraviolet absorber and a light stabilizer selected from any one of the combinations (1) to (3). This improves the corrosion resistance, weather resistance, and adhesion of the surface decoration structure.

A surface decoration structure according to a fifth aspect of the present invention is the surface decoration structure according to any one of the first to fourth aspects in which the topcoat film, the undercoat film, and/or the silver mirror film layer includes, as a corrosion inhibitor, at least one member selected from the group consisting of a triazole compound, a triazine compound, a benzothiazole compound, an aliphatic amide compound, a phosphate amine salt, and a phosphite compound.

In the surface decoration structure according to the fifth aspect, the brightness of the silver mirror film layer is less likely to be affected. The silver mirror film layer can maintain its brightness for a long time. The corrosion inhibitor may be used together with an ultraviolet absorber or with a combination of an ultraviolet absorber and a light stabilizer. The corrosion inhibitor has a good antirust effect with its molecules in contact with or near silver particles, and thus the good antirust effect is achieved with the corrosion inhibitor contained in the topcoat film, the undercoat film, and/or the silver mirror film layer. The silver mirror film layer is thinner than the topcoat film or the undercoat film, and the corrosion inhibitor in the silver mirror film layer can achieve a good antirust effect with a content smaller than the content of the corrosion inhibitor in the topcoat film or the undercoat film. The corrosion inhibitor added to the silver mirror film layer may be of the same type as the corrosion inhibitor added to the topcoat film or the undercoat film to avoid interaction between the corrosion inhibitors.

A surface decoration structure according to a sixth aspect of the present invention includes an undercoat film, a silver mirror film layer, and a topcoat film formed on a surface of a substrate. The silver mirror film layer includes a film of stacked nanometer-sized silver particles, and the topcoat film includes a resin film containing a polar group.

In the surface decoration structure according to the sixth aspect, the topcoat film is a resin film containing a polar group, and allows the topcoat film and the silver mirror film to have a stronger bond between them. Thus, the topcoat film and the silver mirror film layer in the surface decoration structure are resistant to peeling.

A surface decoration structure according to a seventh aspect of the present invention is the surface decoration structure according to the sixth aspect in which the polar group includes an OH group or an $NH_2$ group.

The surface decoration structure according to the seventh aspect further enhances the effects of the surface decoration structure according to the sixth aspect.

A surface decoration structure according to an eighth aspect of the present invention is the surface decoration structure according to the sixth aspect in which the topcoat film includes an acrylic urethane resin film, a polyurethane resin film, a silicone resin film, an acrylic silicone resin film, or an acrylic melamine resin film.

In the surface decoration structure according to the eighth aspect, the acrylic urethane resin film, the polyurethane resin film, the silicone resin film, the acrylic silicone resin film, and the acrylic melamine resin film each contain an OH group or an $NH_2$ group as a polar group. Thus, the surface decoration structure enhances the effects of the surface decoration structure according to the sixth aspect.

A surface decoration structure according to a ninth aspect of the present invention is the surface decoration structure according to the sixth aspect in which the undercoat film is of the same type as the topcoat film.

The surface decoration structure according to the ninth aspect includes the undercoat film and the topcoat film of the same type, and thus produces the functional effects between the topcoat film and the silver mirror film layer, and also between the undercoat film and the silver mirror film layer, and thus enhances the above effects.

A surface decoration structure according to a tenth aspect of the present invention is the surface decoration structure according to the sixth aspect in which the topcoat film and/or the undercoat film includes an ultraviolet absorber and a light stabilizer selected from any of combinations (1) to (3):

(1) a benzotriazole compound and a benzoate compound,
(2) a benzotriazole compound and a hindered amine compound, and
(3) a triazine compound and a hindered amine compound.

In the surface decoration structure according to the tenth aspect, at least the topcoat film includes an ultraviolet absorber and a light stabilizer selected from any one of the combinations (1) to (3). This improves the corrosion resistance, weather resistance, and adhesion of the surface decoration structure.

A surface decoration structure according to an eleventh aspect of the present invention is the surface decoration structure according to any one of the sixth to tenth aspects in which the topcoat film, the undercoat film, and/or the silver mirror film layer includes, as a corrosion inhibitor, at least one member selected from the group consisting of a triazole compound, a triazine compound, a benzothiazole compound, an aliphatic amide compound, a phosphate amine salt, and a phosphite compound.

In the surface decoration structure according to the eleventh aspect, the brightness of the silver mirror film layer is less likely to be affected. The silver mirror film layer can maintain its brightness for a long time. The corrosion inhibitor may be used together with an ultraviolet absorber or with a combination of an ultraviolet absorber and a light stabilizer. The corrosion inhibitor has a good antirust effect with its molecules in contact with or near silver particles, and thus the good antirust effect is achieved with the corrosion inhibitor contained in the topcoat film, the undercoat film, and/or the silver mirror film layer. The silver mirror film layer is thinner than the topcoat film or the undercoat film, and the corrosion inhibitor in the silver mirror film layer can achieve a good antirust effect with a content smaller than the content of the corrosion inhibitor in the topcoat film or the undercoat film. The corrosion inhibitor added to the silver mirror film layer may be of the same type as the corrosion inhibitor added to the topcoat film or the undercoat film to avoid interaction between the corrosion inhibitors.

A surface decoration structure forming method according to a twelfth aspect of the present invention is a surface decoration structure forming method of forming, in sequence, an undercoat film, a silver mirror film layer, and a topcoat film on a surface of a substrate. The method includes forming the undercoat film by spray-painting the surface of the substrate with an undercoat and drying the undercoat, forming the silver mirror film layer by spray-painting the substrate having the undercoat film thereon with a composition liquid for forming the silver mirror film layer including nanometer-sized silver particles dispersed in an organic solvent containing a dissolved polymer dispersing agent, and drying the liquid at room temperature or under heat, and forming the topcoat film by spray-painting a surface of the silver mirror film layer with a topcoat including, as a solvent, at least one member selected from the group consisting of an aliphatic hydrocarbon compound, an aliphatic hydrocarbon compound solution including 10% by mass or less of an aromatic compound, and diisobutyl ketone, and drying the topcoat.

A surface decoration structure forming method according to a thirteenth aspect of the present invention is the surface decoration structure forming method according to the twelfth aspect in which the aliphatic hydrocarbon compound includes at least one member selected from the group consisting of n-hexane, n-heptane, cyclohexane, and ethylcyclohexane.

A surface decoration structure forming method according to a fourteenth aspect of the present invention is the surface decoration structure forming method according to the twelfth aspect in which the undercoat is of the same type as the topcoat.

A surface decoration structure forming method according to a fifteenth aspect of the present invention is the surface decoration structure forming method according to the twelfth aspect in which the topcoat and/or the undercoat includes an ultraviolet absorber and a light stabilizer selected from any of combinations (1) to (3):
(1) a benzotriazole compound and a benzoate compound,
(2) a benzotriazole compound and a hindered amine compound, and
(3) a triazine compound and a hindered amine compound.

A surface decoration structure forming method according to a sixteenth aspect of the present invention is the surface decoration structure forming method according to any one of the twelfth to fifteenth aspects in which the topcoat, the undercoat, and/or the composition liquid for forming the silver mirror film layer includes, as a corrosion inhibitor, at least one member selected from the group consisting of a triazole compound, a triazine compound, a benzothiazole compound, an aliphatic amide compound, a phosphate amine salt, and a phosphite compound.

A surface decoration structure forming method according to a seventeenth aspect of the present invention is a surface decoration structure forming method of forming, in sequence, an undercoat film, a silver mirror film layer, and a topcoat film on a surface of a substrate. The method includes forming the undercoat film by spray-painting the surface of the substrate with an undercoat and drying the undercoat, forming the silver mirror film layer by spray-painting the substrate having the undercoat film thereon with a composition liquid for forming the silver mirror film layer including nanometer-sized silver particles dispersed in an organic solvent containing a dissolved polymer dispersing agent, and drying the liquid at room temperature or under heat, and forming the topcoat film by spray-painting a surface of the silver mirror film layer with a topcoat including a resin containing a polar group and drying the topcoat.

A surface decoration structure forming method according to an eighteenth aspect of the present invention is the surface decoration structure forming method according to the seventeenth aspect in which the polar group includes an OH group or an $NH_2$ group.

A surface decoration structure forming method according to a nineteenth aspect of the present invention is the surface decoration structure forming method according to the seventeenth aspect in which the topcoat includes an acrylic urethane resin coat, a polyurethane resin coat, a silicone resin coat, an acrylic silicone resin coat, or an acrylic melamine resin coat.

A surface decoration structure forming method according to a twentieth aspect of the present invention is the surface decoration structure forming method according to the seventeenth aspect in which the undercoat is of the same type as the topcoat.

A surface decoration structure forming method according to a twenty-first aspect of the present invention is the surface decoration structure forming method according to the seventeenth aspect in which the topcoat and/or the undercoat includes an ultraviolet absorber and a light stabilizer selected from any of combinations (1) to (3):
(1) a benzotriazole compound and a benzoate compound,
(2) a benzotriazole compound and a hindered amine compound, and
(3) a triazine compound and a hindered amine compound.

A surface decoration structure forming method according to a twenty-second aspect of the present invention is the surface decoration structure forming method according to any one of the seventeenth to twenty-first aspects in which the topcoat, the undercoat, and/or the composition liquid for forming the silver mirror film layer includes, as a corrosion inhibitor, at least one member selected from the group consisting of a triazole compound, a triazine compound, a benzothiazole compound, an aliphatic amide compound, a phosphate amine salt, and a phosphite compound.

The surface decoration structure forming method according to any one of the twelfth to sixteenth aspects and the seventeenth to twenty-second aspects allows easy formation of the surface decoration structure according to any one of the first to fifth aspects and the sixth to eleventh aspects.

Advantageous Effects

As described above, the surface decoration structure and the method of forming the surface decoration structure according to the above aspects of the present invention improve the properties of the silver mirror film layer including mirror surface appearance, corrosion resistance, lightfastness, and adhesion.

DETAILED DESCRIPTION

A surface decoration structure including a silver mirror film layer and a method of forming the surface decoration structure according to one or more embodiments of the present invention will now be described in detail with reference to Examples. Examples described below merely embody the technical idea of the present invention, and do not limit the invention to these examples. The present invention may equally apply to other embodiments that fall within the scope of the claims.

Figure 1:
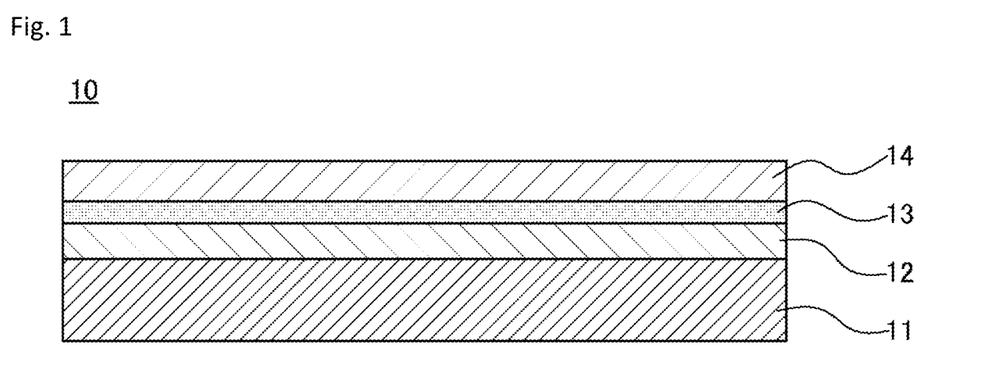
FIG. 1 is a schematic cross-sectional view of a surface decoration structure including a silver mirror film layer produced in Examples and a preparatory experiment.

FIG. 1 is a schematic cross-sectional view of a surface decoration structure including a silver mirror film layer produced in each of Examples and a preparatory experiment according to embodiments of the present invention. A surface decoration structure 10 including the silver mirror film layer includes a substrate 11, an undercoat film 12 formed on the surface of the substrate 11, a silver mirror film layer 13 formed on the surface of the undercoat film 12, and a topcoat film 14 formed on the surface of the silver mirror film layer 13. Examples and the preparatory experiment will be described in detail below focusing on the formation of the substrate 11, the undercoat film 12, the silver mirror film layer 13, and the topcoat film 14.

The substrate that may be used in the present embodiment is selected as appropriate from various metals such as Al, Fe, Mg, and Ti or their alloys, and such metals and alloys with coating anodized on their surfaces, and nonmetallic materials including synthetic resins such as an epoxy resin, a phenol resin, a polyester resin, polyethylene, an acrylonitrile butadiene styrene (ABS) resin, and nylon and composites of such synthetic resins and reinforcement fibers (e.g., a glass fiber, a carbon fiber, an aramid fiber, and an alumina fiber).

Example coats that may be used as undercoat paint or topcoat paint include (1) a two-part acrylic urethane resin coat formed by urethane reaction of an isocyanate group with a hydroxyl group, (2) a two-part acrylic silicone resin coat formed by dehydration and dealcoholization condensation reaction of an acrylic resin having an amino group and a silicon compound having an epoxy group, and (3) a two-part or three-part urethane-modified acrylic silicone resin coat formed by urethane reaction simultaneous with dehydration and dealcoholization condensation reaction. However, fluororesin coats, polyethylene coats, and polypropylene coats may also be used.

A composition liquid for forming a silver mirror film layer is selected as appropriate from commercially available liquids prepared by the method described in Patent Literature 3. Spray-painting is performed under the same conditions in Examples to provide substantially the same thickness of paint.

Preparatory Experiment

Undercoat Film

A preparatory experiment was first conducted to identify an issue with a surface decoration structure including a silver mirror film layer. An undercoat was prepared by uniformly stirring and mixing 6 parts by mass of an acrylic urethane coat (AT62-2 (product name), Dai Nippon Toryo Co., Ltd.) having acrylic polyol as a main material, 7 parts by mass of toluene as a solvent, and 1 part by mass of a polyisocyanate hardening agent (Acrythane (product name) hardening agent, Dai Nippon Toryo Co., Ltd.). The undercoat was spray-painted on the surfaces of standard test pieces serving as bases, and then underwent forced drying at 100° C. for 30 minutes to produce multiple standard test piece samples for the preparatory experiment each with an undercoat film.

Silver Mirror Film Layer

As a composition liquid for forming a silver mirror film layer, a composition liquid prepared based on Patent Literature 3 and commercially available (GLANZCOAT Type RT Silver (product name), FECT Inc Co.) was used. This composition liquid was diluted twice with thinner (GLANZCOAT Type RT Silver Thinner T2 (product name), FECT Inc Co.), spray-painted, and then dried at 95° C. for 45 minutes to produce multiple standard test piece samples for the preparatory experiment each with a silver mirror film layer formed on the undercoat film. The composition liquid for forming a silver mirror film layer was a dispersing agent containing silver nanoparticles in an organic solvent as main components and additionally including a polymer dispersing agent. Although the spray-painted composition liquid can form a silver mirror film layer through natural drying, the composition liquid underwent forced drying at 90° C. for 45 minutes to allow each silver mirror film layer to form under the same drying conditions without being affected by room temperature and humidity.

Topcoat Film

A topcoat was prepared by uniformly stirring and mixing 6 parts by mass of an acrylic urethane coat (AT62-2) having acrylic polyol as a main material, 7 parts by mass of ethanol as a solvent, and 1 part by mass of a polyisocyanate hardening agent (Acrythane hardening agent). The topcoat was spray-painted on the surfaces of the silver mirror film layers, and then underwent forced drying at 100° C. for 30 minutes to produce multiple preparatory experiment samples as standard test pieces each with the undercoat film, the silver mirror film layer, and the topcoat film.

The standard test piece samples produced in this manner for the preparatory experiment were visually inspected. The inspection revealed that the mirror luster partially reduced during or after the topcoat painting on the surfaces of the silver mirror film layers.

Figure 2:
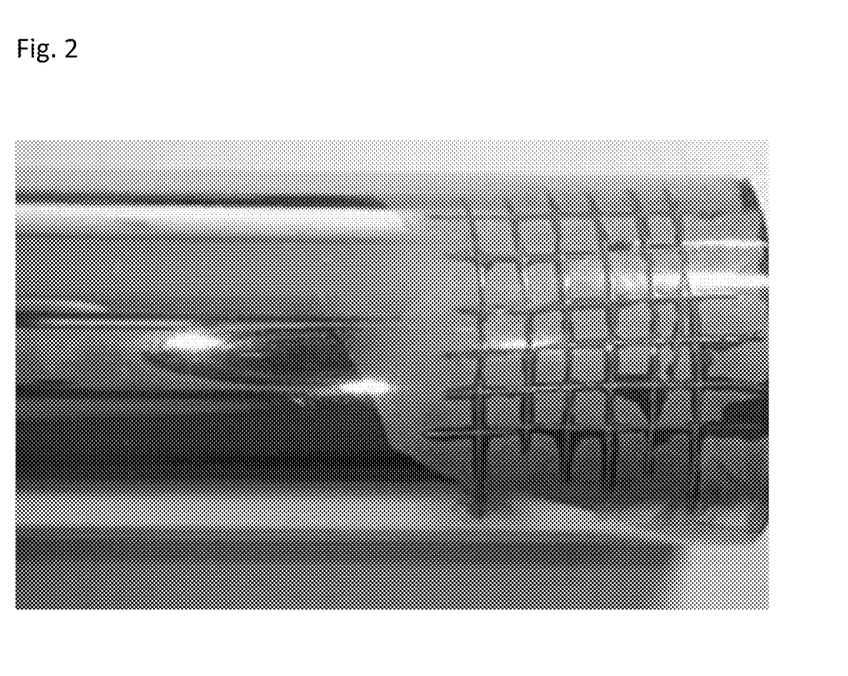
FIG. 2 is a photograph showing the results of a saltwater spray test conducted on a preparatory experiment sample.
Figure 3:
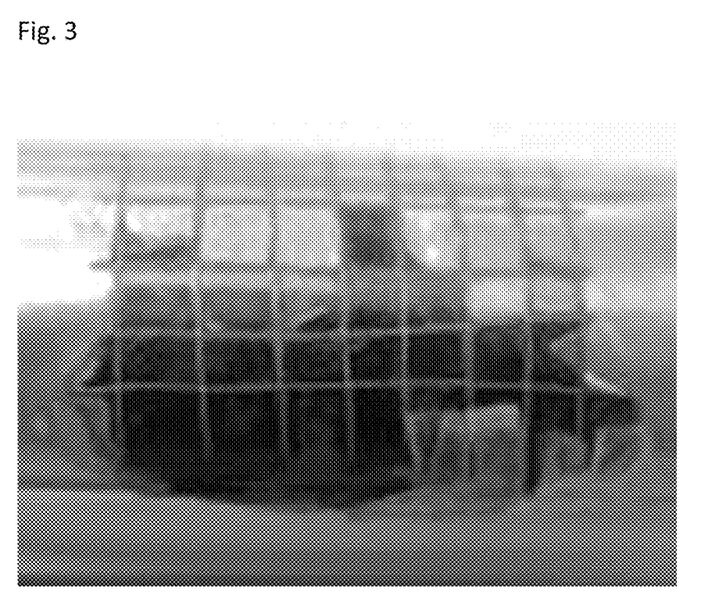
FIG. 3 is a photograph showing the results of an adhesion test conducted on the preparatory experiment sample.

The standard test piece samples for the preparatory experiment were further subjected to the tests below to reveal the following:

(1) A saltwater spray test according to JIS K5600-7-1 on a surface with a cross-cut revealed discoloration or peeling at the cross-cut (refer to FIG. 2).
(2) An accelerated weathering test with a xenon arc lamp according to JIS K5600-7-7 revealed yellowing.
(3) An adhesion test according to JIS K5600-5-6 on a surface with a cross-cut revealed peeling between the silver mirror film layer and the undercoat film or between the silver mirror film layer and the topcoat film (refer to FIG. 3).

Figure 4A:
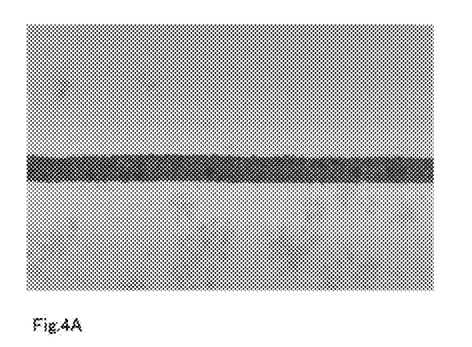
FIG. 4A is a TEM photograph of a cross section of the preparatory experiment sample magnified 100,000 times.
Figure 4B:
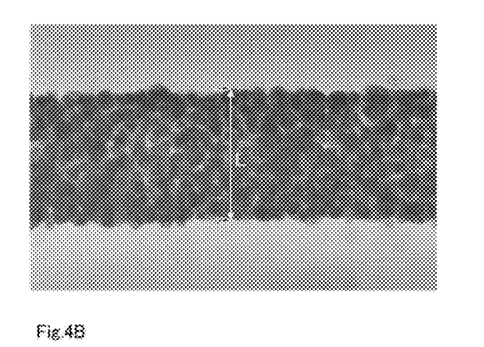
FIG. 4B is a TEM photograph of the same cross section magnified 500,000 times.

The results of the preparatory experiment suggest that the silver mirror film layer in Patent Literature 3 produced using the composition liquid for forming a silver mirror film layer containing silver nanoparticles and the polymer dispersing agent has a structural difference from the silver conductive layer in Patent Literature 2 produced similarly using ink containing silver nanoparticles but baked at 100 to 180° C. To analyze the cross section of the silver mirror film layer, a cross-sectional sample was removed from a standard test piece sample for the preparatory experiment using a microtome, and then observed with a transmission electron microscope (TEM) to observe the cross section. FIGS. 4A and 4B show the results. FIG. 4A is a TEM photograph of the cross section magnified 100,000 times. FIG. 4B is a TEM photograph of the same cross section magnified 500,000 times, in which L=120 nm.

The photographs of FIGS. 4A and 4B show the silver mirror film layer produced using the composition liquid containing silver nanoparticles and the polymer dispersing agent including individual silver nanoparticles accumulated instead of being sintered. In particular, the photograph of FIG. 4B shows the individual silver nanoparticles with substantially uniform sizes and a diameter of tens of nanometers.

Figure 5A:
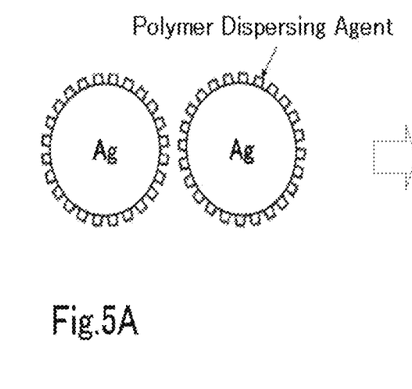
FIGS. 5A to 5C are schematic diagrams describing, in a step-by-step manner, the formation of the silver mirror film layer in Examples and the preparatory experiment.
Figure 5B:
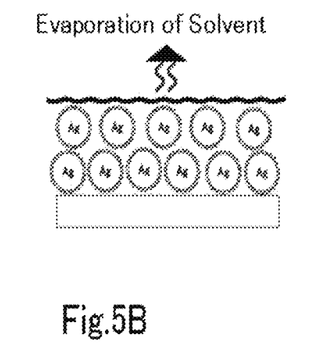
Figure 5C:
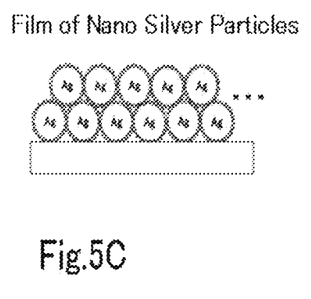

The composition liquid for forming a silver mirror film layer used in the preparatory experiment is a volatile solvent except the silver nanoparticles and the polymer dispersing agent. The silver mirror film layer using this composition liquid is expected to form in the stepwise manner shown in FIGS. 5A to 5C. More specifically, the silver nanoparticles are uniformly dispersed in the composition liquid for forming a silver mirror film layer with the polymer dispersing agent adhering to the outer surfaces of the nanoparticles (FIG. 5A). When the composition liquid is applied to the surface of the base as a film, the solvent gradually evaporates (FIG. 5B). The solvent evaporation is complete to form a silver mirror film layer including stacked silver nanoparticles with the polymer dispersing agent adhering to their outer surfaces. The polymer dispersing agent is reticulated three-dimensionally between the silver nanoparticles of the silver mirror film layer (FIG. 5C). The uniform silver mirror film layer is thus obtained although the liquid is dried under room temperature or moderate heating conditions at 100° C. or less.

Thus, an approach different from any known manner is to be taken to overcome the difficulties while increasing the potential of forming a silver mirror film layer using a composition liquid for forming a silver mirror film layer containing silver nanoparticles and a polymer dispersing agent. The technical effect of a surface decoration structure including a silver mirror film layer and a method of forming the surface decoration structure according to one or more embodiments of the present invention will now be described in detail with reference to Examples.

Solvent Types and Their Effects on Silver Mirror Film Layer

In Examples 1 to 21, liquids for forming a topcoat film prepared using various solvents were spray-painted on silver mirror film layers preformed on undercoat paint. After drying, the degree of discoloration of each silver mirror film layer was visually observed.

Example 1

Undercoat Film

An undercoat was prepared by uniformly stirring and mixing 6 parts by mass of silicone oligomer (GLANZCOAT Type RT Primer Black G, FECT Inc Co.) having an alkoxyl group as a main material for the undercoat, 7 parts by mass of ethanol as a solvent, and 1 part by mass of a hardening agent (GLANZCOAT type RT Primer Hardening Agent U, FECT Inc Co.). The undercoat was spray-painted on the surface of a standard test piece serving as a base, and then underwent forced drying at 100° C. for 30 minutes to produce a standard test piece sample with an undercoat film.

Silver Mirror Film Layer

A composition liquid for forming a silver mirror film layer prepared based on Patent Literature 3 and commercially available was used (GLANZCOAT Type RT Silver). The composition liquid was diluted twice with thinner (GLANZCOAT Type RT Silver Thinner T2), spray-painted, and then dried at 100° C. for 30 minutes to produce a standard test piece with a silver mirror film layer formed on the undercoat film. The composition liquid for forming a silver mirror film layer was also a dispersing agent containing silver nanoparticles in an organic solvent as main components and also including a polymer dispersing agent. After spray-painting of the composition liquid, natural drying can form a silver mirror film layer. However, in each Example, each silver mirror film layer underwent drying at 100° C. for 30 minutes to form under the same drying conditions without being affected by room temperature and humidity.

Topcoat Film

A topcoat was prepared by uniformly stirring and mixing 10 parts by mass of silicone oligomer (GLANZCOAT Type RT Primer Top, FECT Inc Co.) having an alkoxyl group as a main material for the topcoat, 7 parts by mass of ethanol as a solvent, and 1 part by mass of a hardening agent (GLANZCOAT type RT Top Hardening Agent G, FECT Inc Co.). The topcoat was spray-painted on the surface of the silver mirror film layer, and then underwent forced drying at 100° C. for 30 minutes to produce a silver mirror filmed sample for Example 1 with the undercoat film, the silver mirror film layer, and the topcoat film formed on the surface of the standard test piece. The topcoat used was a transparent coat film.

Example 2

A silver mirror filmed sample for Example 2 with an undercoat film, a silver mirror film layer, and a topcoat film formed on the surface of a standard test piece was obtained in the same manner as in Example 1 except that ethanol was replaced by isopropyl alcohol as a solvent for the undercoat and the topcoat.

Example 3

A silver mirror filmed sample for Example 3 with an undercoat film, a silver mirror film layer, and a topcoat film formed on the surface of a standard test piece was obtained in the same manner as in Example 1 except that ethanol was replaced by butanol as a solvent for the undercoat and the topcoat.

Example 4

A silver mirror filmed sample for Example 4 with an undercoat film, a silver mirror film layer, and a topcoat film formed on the surface of a standard test piece was obtained in the same manner as in Example 1 except that ethanol was replaced by ethyl acetate as a solvent for the undercoat and the topcoat.

Example 5

A silver mirror filmed sample for Example 5 with an undercoat film, a silver mirror film layer, and a topcoat film formed on the surface of a standard test piece was obtained in the same manner as in Example 1 except that ethanol was replaced by butyl acetate as a solvent for the undercoat and the topcoat.

Example 6

A silver mirror filmed sample for Example 6 with an undercoat film, a silver mirror film layer, and a topcoat film formed on the surface of a standard test piece was obtained in the same manner as in Example 1 except that ethanol was replaced by propylene glycol monomethyl ether acetate as a solvent for the undercoat and the topcoat.

Example 7

A silver mirror filmed sample for Example 7 with an undercoat film, a silver mirror film layer, and a topcoat film formed on the surface of a standard test piece was obtained in the same manner as in Example 1 except that ethanol was replaced by methyl ethyl ketone as a solvent for the undercoat and the topcoat.

Example 8

A silver mirror filmed sample for Example 8 with an undercoat film, a silver mirror film layer, and a topcoat film formed on the surface of a standard test piece was obtained in the same manner as in Example 1 except that ethanol was replaced by diisobutyl ketone as a solvent for the undercoat and the topcoat.

Example 9

A silver mirror filmed sample for Example 9 with an undercoat film, a silver mirror film layer, and a topcoat film formed on the surface of a standard test piece was obtained in the same manner as in Example 1 except that ethanol was replaced by methyl isobutyl ketone as a solvent for the undercoat and the topcoat.

Example 10

A silver mirror filmed sample for Example 10 with an undercoat film, a silver mirror film layer, and a topcoat film formed on the surface of a standard test piece was obtained in the same manner as in Example 1 except that ethanol was replaced by cyclohexanone as a solvent for the undercoat and the topcoat.

Example 11

A silver mirror filmed sample for Example 11 with an undercoat film, a silver mirror film layer, and a topcoat film formed on the surface of a standard test piece was obtained in the same manner as in Example 1 except that ethanol was replaced by ethylene glycol monomethyl ether as a solvent for the undercoat and the topcoat.

Example 12

A silver mirror filmed sample for Example 12 with an undercoat film, a silver mirror film layer, and a topcoat film formed on the surface of a standard test piece was obtained in the same manner as in Example 1 except that ethanol was replaced by 3-methoxy-1-butanol as a solvent for the undercoat and the topcoat.

Example 13

A silver mirror filmed sample for Example 13 with an undercoat film, a silver mirror film layer, and a topcoat film formed on the surface of a standard test piece was obtained in the same manner as in Example 1 except that ethanol was replaced by toluene as a solvent for the undercoat and the topcoat.

Example 14

A silver mirror filmed sample for Example 14 with an undercoat film, a silver mirror film layer, and a topcoat film formed on the surface of a standard test piece was obtained in the same manner as in Example 1 except that ethanol was replaced by xylene as a solvent for the undercoat and the topcoat.

Example 15

A silver mirror filmed sample for Example 15 with an undercoat film, a silver mirror film layer, and a topcoat film formed on the surface of a standard test piece was obtained in the same manner as in Example 1 except that ethanol was replaced by a solvent naphtha solvent (SOLVESSO 200 (product name), TonenGeneral Sekiyu K.K.) as a solvent for the undercoat and the topcoat.

Example 16

A silver mirror filmed sample for Example 16 with an undercoat film, a silver mirror film layer, and a topcoat film formed on the surface of a standard test piece was obtained in the same manner as in Example 1 except that ethanol was replaced by n-hexane as a solvent for the undercoat and the topcoat.

Example 17

A silver mirror filmed sample for Example 17 with an undercoat film, a silver mirror film layer, and a topcoat film formed on the surface of a standard test piece was obtained in the same manner as in Example 1 except that ethanol was replaced by n-heptane as a solvent for the undercoat and the topcoat.

Example 18

A silver mirror filmed sample for Example 18 with an undercoat film, a silver mirror film layer, and a topcoat film formed on the surface of a standard test piece was obtained in the same manner as in Example 1 except that ethanol was replaced by cyclohexane as a solvent for the undercoat and the topcoat.

Example 19

A silver mirror filmed sample for Example 19 with an undercoat film, a silver mirror film layer, and a topcoat film formed on the surface of a standard test piece was obtained in the same manner as in Example 1 except that ethanol was replaced by ethylcyclohexane as a solvent for the undercoat and the topcoat.

Example 20

A silver mirror filmed sample for Example 20 with an undercoat film, a silver mirror film layer, and a topcoat film formed on the surface of a standard test piece was obtained in the same manner as in Example 1 except that ethanol was replaced by mineral spirits (aromatic hydrocarbons ≤10% by mass) as a solvent for the undercoat and the topcoat.

Example 21

A silver mirror filmed sample for Example 21 with an undercoat film, a silver mirror film layer, and a topcoat film formed on the surface of a standard test piece was obtained in the same manner as in Example 1 except that ethanol was replaced by mineral spirits (aromatic hydrocarbon >10% by mass) as a solvent for the undercoat and the topcoat.

Measurement Results of Examples 1 to 21

The degree of discoloration of each of the silver mirror filmed samples for Examples 1 to 21 was determined by visual observation. Table 1 summarizes the results rated using the symbols below.
(1) A circle indicates that the resultant silver mirror film layer is substantially uniform with no unevenness observed in its brightness.
(2) A triangle indicates that partial and slight unevenness is observed in the brightness.
(3) A cross indicates that marked unevenness is observed in the brightness.

TABLE 1

| | Solvent for Topcoat | Color Fastness |
|---|---|---|
| Example 1 | Ethanol | X |
| Example 2 | Isopropyl Alcohol | X |
| Example 3 | Butanol | X |
| Example 4 | Ethyl Acetate | Δ |
| Example 5 | Butyl Acetate | Δ |
| Example 6 | Propylene Glycol Monomethyl Ether Acetate | Δ |
| Example 7 | Methyl Ethyl Ketone | Δ |
| Example 8 | Diisobutyl Ketone | ○ |
| Example 9 | Methyl Isobutyl Ketone | Δ |
| Example 10 | Cyclohexanone | Δ |
| Example 11 | Ethylene Glycol Monomethyl Ether | Δ |
| Example 12 | 3-Methoxy-1-Butanol | Δ |

TABLE 1-continued

| | Solvent for Topcoat | Color Fastness |
|---|---|---|
| Example 13 | Toluene | Δ |
| Example 14 | Xylene | Δ |
| Example 15 | SOLVESSO200* | Δ |
| Example 16 | n-Hexane | ○ |
| Example 17 | n-Heptane | ○ |
| Example 18 | Cyclohexane | ○ |
| Example 19 | Ethylcyclohexane | ○ |
| Example 20 | Mineral spirit (Aromatic Hydrocarbon ≤ 10 vol %) | ○ |
| Example 21 | Mineral spirit (Aromatic Hydrocarbon > 10 vol %) | Δ |

*Product name (Solvent naphtha Solvent )

The results in Table 1 reveal the following. Marked unevenness was observed in the brightness of silver mirror filmed samples in which solvents were alcohol compounds: ethanol (Example 1), isopropyl alcohol (Example 2), and butanol (Example 3). Slight unevenness was observed in the brightness of silver mirror filmed samples in which solvents were ethyl acetate (Example 4), butyl acetate (Example 5), propylene glycol monomethyl ether acetate (Example 6), methyl ethyl ketone (Example 7), methyl isobutyl ketone (Example 9), cyclohexanone (Example 10), ethylene glycol monomethyl ether (Example 11), 3-methoxy-1-butanol (Example 12), toluene (Example 13), xylene (Example 14), SOLVESSO 200, or a solvent naphtha solvent (Example 15), and mineral spirits (aromatic hydrocarbon >10% by mass) (Example 21). In contrast, for the silver mirror filmed samples in which diisobutyl ketone (Example 8), n-hexane (Example 16), n-heptane (Example 17), cyclohexane (Example 18), ethylcyclohexane (Example 19), and mineral spirits (aromatic hydrocarbons ≤10% by mass) (Example 20) were used as the solvents, substantially no unevenness was observed in their brightness. These samples maintained good brightness.

The results show that alcohol compounds most adversely affect the brightness of a silver mirror film layer, followed by ester compounds, ketone compounds, ether compounds, and aromatic compounds. The samples using aliphatic hydrocarbon compounds maintained the best brightness of a silver mirror film layer.

Among the ketone compounds, diisobutyl ketone (Example 8) maintained good brightness of the silver mirror film layer, but methyl ethyl ketone (Example 7) and methyl isobutyl ketone (Example 9) had lower brightness of the silver mirror film layers. This may result from the chemical structure of diisobutyl ketone represented by chemical formula 1 below, or specifically the configuration with four methyl groups arranged at equal distances outside the oxygen atom of the ketone group, and thus from the steric hindrance of the four methyl groups causing the oxygen atom of the ketone group to serve as a substantially nonpolar group.

Chemical Formula 1

(1)

Thus, the results in Table 1 show that a silver mirror film layer with good brightness is obtained by selecting at least one of aliphatic hydrocarbon compounds or diisobutyl ketone as a solvent for the topcoat, because cyclohexane is classified as a cyclic aliphatic hydrocarbon compound. Mineral spirits are a petroleum solvent having an aliphatic hydrocarbon compound as a main component and classified as industrial gasoline containing aromatic hydrocarbons. The content of aromatic hydrocarbons greater than 10% by mass (Example 21) adversely affects the brightness of the silver mirror film layer, whereas the content of aromatic hydrocarbons equal to or smaller than 10% by mass (Example 20) maintained good brightness of the silver mirror film layer. Thus, the solvent for a topcoat may contain an aliphatic hydrocarbon compound and 10% by mass or less of an aromatic compound in diisobutyl ketone.

Examples 22 to 26

In Examples 22 to 26, the solvents used were prepared by diluting commercially available thinner (35% by mass of toluene and 65% by mass of ethyl acetate) with mineral spirits (an aromatic hydrocarbon content of less than 10% by mass) added up to 10% by mass (Example 22), 30% by mass (Example 23), 50% by mass (Example 24), 80% by mass (Example 25), and 90% by mass (Example 26). The effects of the solvents on the brightness of the silver mirror film layers were investigated. More specifically, silver mirror filmed samples for Examples 22 to 26 with an undercoat film, a silver mirror film layer, and a topcoat film formed on the surface of each standard test piece were obtained in the same manner as in Example 1 except that the solvent for the undercoat and the topcoat was prepared by adding the mineral spirits to the thinner, and the brightness of the silver mirror film layers was visually observed. Table 2 summarizes the results.

TABLE 2

| | Mineral spirit addition rate in thinner (vol %) | Color Fastness |
|---|---|---|
| Example 22 | 10 | X |
| Example 23 | 30 | ○ |
| Example 24 | 50 | ○ |
| Example 25 | 80 | ○ |
| Example 26 | 90 | X |

The results of Examples 22 to 26 show that a silver mirror film layer with good brightness is obtained by diluting the thinner used as a solvent for at least the topcoat to add mineral spirits up to 30 to 80% by mass. The results may suggest that a silver mirror film layer with good brightness is obtained when the content of aromatic compound components in the mixed solvent of thinner and mineral spirits falls within an appropriate range.

Examples 27 to 34

In Examples 27 to 34, a color fastness test was conducted with an ultraviolet (UV) absorber and a light stabilizer added. Silver mirror filmed samples each with a UV absorber and a light stabilizer added to the topcoat film were obtained. The degree of discoloration was visually observed after an accelerated weathering test with a xenon arc lamp.

Commercially available benzotriazole compounds (Examples 27 and 31), triazine compounds (Examples 28 and 32), benzophenone compounds (Examples 29 and 33), and cyanoacrylate compounds (Examples 30 and 34) as UV absorbers were each added to the topcoat in Example 16 with the silver filmed sample with good brightness to constitute 5% by mass in the total mass of the topcoat. Commercially available benzoate compounds (Examples 27 to 30) or hindered amine compounds (Examples 31 to 34) as light stabilizers were further added up to 2% by mass. In the same manner as in Example 16 except for these additives, silver mirror filmed samples with an undercoat film, a silver mirror film layer, and a topcoat film formed on the surface of each standard test piece were obtained for Examples 27 to 34. The undercoat film was produced from the same material as the topcoat but without the UV absorber or the light stabilizer.

Each of the silver mirror filmed samples produced for Examples 27 to 34 was subjected to an accelerated weathering test with a xenon arc lamp by the method according to JIS K5600-7-7. The degree of yellowing on the surface of each silver mirror filmed sample is rated using the symbols below. A double circle indicates that no yellowing was observed. A circle indicates that slight yellowing was observed. A triangle indicates that light yellowing was observed. A cross indicates that marked yellowing was observed. Table 3 summarizes the results.

TABLE 3

|  | UV Absorber | Light Stabilizer | Color Fastness |
|---|---|---|---|
| Example 27 | Benzotriazole | Benzoate | ○ |
| Example 28 | Triazine |  | Δ |
| Example 29 | Benzophenone |  | Δ |
| Example 30 | Cyanoacrylate |  | X |
| Example 31 | Benzotriazole | Hindered amine | ◎ |
| Example 32 | Triazine |  | ○ |
| Example 33 | Benzophenone |  | Δ |
| Example 34 | Cyanoacrylate |  | Δ |

Example 35

The results in Table 3 show good color fastness achieved using a benzotriazole compound as a UV absorber and a hindered amine compound as a light stabilizer. In Example 35, the additive amount of a benzotriazole compound as a UV absorber was changed stepwise from 0.5 to 15.0% by mass, and the additive amount of a hindered amine compound as a light stabilizer was changed stepwise from 0.5 to 5.0% by mass. In the same manner as in Examples 27 to 34 except for the changes, multiple silver mirror filmed samples for Example 35 with an undercoat film, a silver mirror film layer, and a topcoat film formed on the surface of each standard test piece were obtained. The resultant samples were subjected to the same accelerated weathering test as in Examples 27 to 34. Table 4 summarizes the results.

TABLE 4

| UV Absorber* | Hindered Amine Light Stabilizer (vol %) | | | | | |
|---|---|---|---|---|---|---|
| Additive Amount (vol %) | 0.5 | 1.0 | 2.0 | 3.0 | 4.0 | 5.0 |
| 0.5 | Δ | Δ | Δ | X | X | X |
| 1.0 | Δ | ○ | ○ | Δ | Δ | Δ |
| 2.0 | Δ | ○ | ○ | Δ | Δ | Δ |
| 4.0 | Δ | ◎ | ◎ | ○ | ○ | Δ |
| 6.0 | ○ | ◎ | ◎ | ○ | ○ | Δ |
| 10.0 | Δ | ○ | ○ | Δ | Δ | Δ |
| 15.0 | Δ | Δ | Δ | Δ | Δ | X |

*Benzotriazole Compounds

The results in Table 4 show that the additive amount of a UV absorber including a benzotriazole compound may be 1.0 to 10% by mass, and the additive amount of a hindered amine light stabilizer may be 0.5 to 4.0% by mass, to the total volume of the main material for the topcoat. The best additive amount of a UV absorber including a benzotriazole compound is 4.0 to 6.0% by mass, and the best additive amount of a hindered amine light stabilizer is 1.0 to 2.0% by mass, to the total volume of the main material for the topcoat.

In Examples 27 to 35, the UV absorber and the light stabilizer were added to the topcoat films alone to produce the silver mirror filmed samples. However, the UV absorber and the light stabilizer may also be added to the undercoat film. The UV absorber and the light stabilizer may be added to the undercoat film alone. In particular, with the UV absorber and the light stabilizer added to both the topcoat film and the undercoat film, the undercoat and the topcoat may have the same composition, simplifying the process of forming the topcoat film and the undercoat film.

Examples 36 to 41

In Examples 36 to 41, silver mirror filmed samples each with a corrosion inhibitor added to the topcoat film and the undercoat film were obtained. After the topcoat film was formed, the degree of discoloration of the silver mirror film layer was observed. More specifically, corrosion inhibitors that are a commercially available triazole compound (Example 36), triazine compound (Example 37), benzothiazole compound (Example 38), aliphatic amide compound (Example 39), phosphonate amine salt (Example 40), and phosphite compound (Example 41) were each added up to 5% by mass to the total volume of the topcoat. In the same manner as in Example 16 except for these additives, silver mirror filmed samples with an undercoat film, a silver mirror film layer, and a topcoat film formed on the surface of each standard test piece were obtained for Example 36 to 41.

Each of the silver mirror filmed samples produced in Examples 36 to 41 was subjected to the saltwater spray test according to JIS K5600-7-1, and the degree of discoloration of the silver mirror film layer was determined by visual observation. The degree of discoloration was rated using the symbols below. A double circle indicates that no discoloration was observed. A circle indicates that slight discoloration was observed. A triangle indicates that light discoloration was observed. A cross indicates that marked discoloration was observed. Table 5 summarizes the results.

TABLE 5

|  | Type of Corrosion Inhibitor | Color Fastness |
|---|---|---|
| Example 36 | Triazole | ◎ |
| Example 37 | Triazine | ○ |
| Example 38 | Benzothiazole | ○ |
| Example 39 | Aliphatic Amide | ○ |
| Example 40 | Phosphate Amine Salt | Δ |
| Example 41 | Phosphite | Δ |

In each of Examples 27 to 35, the UV absorber and the light stabilizer were added to the topcoat film or the undercoat film. In each of Examples 36 to 41, the corrosion inhibitor was added to the topcoat film or the undercoat film. However, the corrosion inhibitor, the UV absorber, and the light stabilizer may be added at a time to the topcoat film or the undercoat film. In some embodiments, the corrosion inhibitor may be added not only to the topcoat film or the undercoat film but also to the composition liquid for forming a silver mirror film layer, and the silver mirror film layer may also contain the corrosion inhibitor. In other embodiments, the corrosion inhibitor may not be added to the topcoat film or the undercoat film but may be added to the silver mirror film layer. More specifically, the corrosion inhibitor has a good antirust effect with its molecules in contact with or near silver particles, and thus the good antirust effect is achieved with the corrosion inhibitor contained in the topcoat film, the undercoat film, and/or the silver mirror film layer.

The silver mirror film layer is much thinner than the topcoat film or the undercoat film, and the corrosion inhibitor in the silver mirror film layer can achieve a good antirust effect with a content smaller than the content of the corrosion inhibitor in the topcoat film or the undercoat film. The corrosion inhibitor added to the composition liquid may be less than the corrosion inhibitor added to the topcoat or the undercoat. The corrosion inhibitor added to the composition liquid may be of the same type as the corrosion inhibitor added to the topcoat or the undercoat to avoid interaction between the corrosion inhibitors.

Examples 42 to 46

The results in Table 5 show that the corrosion inhibitor may be triazolic. In Examples 42 to 46, the content of a commercially available triazolic corrosion inhibitor added was changed to 1% by mass (Example 42), 2% by mass (Example 43), 5% by mass (Example 44), 10% by mass (Example 45), and 20% by mass (Example 46) to the total volume of the topcoat and the undercoat. The degree of discoloration was determined in the same manner as in Examples 36 to 41. Table 6 summarizes the results.

TABLE 6

|  | Content (vol %) | Color Fastness |
| --- | --- | --- |
| Example 42 | 1 | Δ |
| Example 43 | 2 | ○ |
| Example 44 | 5 | ◎ |
| Example 45 | 10 | ○ |
| Example 46 | 20 | Δ |

The results in Table 6 show that the triazole compound as a corrosion inhibitor achieves a certain degree of antirust effect (color fastness) when the content ranges from 2 to 10% by mass to the total volume of the topcoat and the undercoat. However, extrapolation of the results of Example 43 to Examples 42 and 44 shows that the content of 4 to 7% by mass can achieve better effects.

Examples 47 to 52

In Examples 1 to 46, the coats for forming the topcoat films and the undercoat films used, as the main material, the silicone oligomer having an alkoxyl group. However, in Example 47, an acrylic urethane coat (ACRYDIC A801P (product name), DIC Corporation) was used. In Example 48, a silicone oligomer coat having an alkoxyl group (FOC100 (product name), FECT Inc Co.) different from the silicone oligomer used in Examples 1 to 46 was used. In Example 49, an acrylic silicone coat (B1161 (product name), DIC Corporation) was used. In Example 50, an acrylic melamine coat (ARBT100 (product name), Kuboko Paint Co., Ltd.) was used. In Example 51, an epoxy coat (GR Clear (product name), Cashew Co., Ltd.) was used. In Example 52, methacrylic acid lacquer (ACRYDIC A-166 (product name), DIC Corporation) was used. In the same manner as in Example 16 except for these changes, several silver mirror filmed samples were produced for each of Examples 47 to 52 with an undercoat film, a silver mirror film layer, and a topcoat film formed on the surface of each standard test piece. However, the hardening agent additive amounts and the drying conditions for the coats were prepared based on their catalog values.

The silver mirror filmed samples produced for Examples 47 to 52 were subjected to a peel test corresponding to the cross-cut test according to JIS K5600-5-6, and the degree of their adhesion was measured. The degree of peeling was determined by visual observation, and rated using the symbols below. A double circle indicates that no peeling was observed in all the samples. A circle indicates that partial peeling was observed in several samples. A triangle indicates that much peeling was observed in several samples. A cross indicates that much peeling was observed in all the samples. Table 7 summarizes the results, together with the hardening agent additive amounts, the drying conditions, and the polar group types of the coats.

TABLE 7

|  | Type of Paint | Main Material:Hardening Agent | Drying Conditions | Polar Group | Adhesion |
| --- | --- | --- | --- | --- | --- |
| Example 47 | Acrylic Urethane | 4:1 | 80° C. × 30 min | OH | ○ |
| Example 48 | Silicone oligomer having alkoxyl group | 8:1 | 80° C. × 20 min | OH | ◎ |
| Example 49 | Acrylic Silicone | — | 80° C. × 20 min | OH | ○ |
| Example 50 | Acrylic Melamine | — | 150° C. × 20 min | $NH_2$ | ○~Δ |
| Example 51 | Epoxy | 2:1 | 80° C. × 30 min | $NH_2$ | ○~Δ |
| Example52 | Methacrylic acid lacquer | — | Room Temp | — | X |

The results in Table 7 show that the main materials for the topcoat film and the undercoat film having polar groups such as OH or $NH_2$ provide stronger adhesion than the coat in Example 52 having no polar group. In particular, the results show that the strongest adhesion is achieved by the coat in Example 48 with the main material of silicone oligomer having an alkoxyl group. In addition, the comparison between the results of Examples 47 to 49 and Examples 50 and 51 shows that the OH polar group is related to stronger adhesion than the $NH_2$ polar group.

Examples 53 to 55

The measurement results of Examples 47 to 52 show that stronger adhesion was achieved by a main material having OH polar groups for the topcoat film and the undercoat film. In Examples 53 to 55, different coats having main materials of the same type with different OH values were prepared, and their adhesion of the topcoat films and the undercoat films was observed. More specifically, in Example 53, an acrylic urethane coat with an OH value of 50 (ACRYDIC A801P (product name), DIC Corporation) was used as the main material for the topcoat film and the undercoat film. In Example 54, an acrylic urethane coat with an OH value of 25 (ACRYDIC A837 (product name), DIC Corporation) was used. In Example 55, an acrylic urethane coat with an OH value of 15 (ACRYDIC 57-773 (product name), DIC Corporation) was used. In the same manner as in Example 16 except for these main materials, some silver mirror filmed samples were produced for each of Examples 53 to 55 with an undercoat film, a silver mirror film layer, and a topcoat film formed on the surface of each standard test piece, and subjected to an adhesion test in the same manner as in Examples 47 to 52. However, the hardening agent additive amounts and the drying conditions for the coats were prepared based on their catalog values. Table 8 summarizes the results.

TABLE 8

| | Type of Paint | OH Value | Main Material:Hardening Agent | Drying Conditions | Adhesion |
|---|---|---|---|---|---|
| Example 53 | Acrylic | 50 | 4:1 | 80° C. × 30 min | ◎ |
| Example 54 | Urethane | 25 | 8:1 | | ○ |
| Example 55 | | 15 | 13:1 | | △ |

The results in Table 8 show that a main material for the topcoat film and the undercoat film with a greater OH value, or more polar groups, achieves greater adhesion. The polar groups of main materials included in coats seem to form hydrogen bonds with the polymer dispersing agent on the surfaces of nanometer-sized silver particles. The silver mirror film layer formed in each embodiment described above seems to have the polymer dispersing agent reticulated three-dimensionally between the silver nanoparticles of the silver mirror film layer as shown in FIG. 5C associated with the preparatory experiment. Thus, a main material for the topcoat film and the undercoat film having a large OH value may allow the polymer dispersing agent to trap silver nanoparticles, while forming intermolecular forces such as hydrogen bonds with the topcoat film or the undercoat film to achieve firm bonds.

Interpolation of the results of Examples 53 and 54 reveals that the OH value of a main material for the topcoat film and the undercoat film is specifically 25 or more, and more specifically 40 or more. Although the critical limit of the OH value is unclear, the upper limit is estimated to be about 200 based on typical OH value ranges of commercially available coats.

The invention claimed is:
1. A surface decoration structure including an undercoat film, a silver mirror film layer, and a topcoat film formed on a surface of a substrate, wherein
the silver mirror film layer includes silver nanoparticles and a polymer dispersing agent,
the silver nanoparticles are stacked with the polymer dispersing agent adhering to outer surfaces of the silver nanoparticles, and
the silver mirror film layer is formed in a state in which the polymer dispersing agent is reticulated three-dimensionally between the silver nanoparticles of the silver minor film layer,
the silver mirror film layer is formed from a composition liquid comprising the silver nanoparticles, the polymer dispersing agent, and a silver minor film solvent,
the silver mirror film solvent is a volatile solvent,
the silver nanoparticles are homogeneously dispersed in the silver mirror film solvent with the polymer dispersing agent attached around the silver nanoparticles in the silver mirror film layer application process,
the topcoat film and the undercoat film are formed from a composition including, as a solvent, at least one member selected from the group consisting of an aliphatic hydrocarbon compound solution including 10% by mass or less of an aromatic compound, an aliphatic compound including no aromatic compound, and diisobutyl ketone,
the topcoat film and the undercoat film include a resin film containing a polar group, a benzotriazole compound as an ultraviolet absorber to constitute 1.0-10 wt % for mass of the topcoat film and the undercoat film, respectively, and a hindered amine as a light stabilizer to constitute 0.5-4.0 wt % for mass of the topcoat film and the undercoat film, respectively, and the topcoat film, the undercoat film, and/or the silver mirror film layer includes a triazole compound other than the benzotriazole compound, as a corrosion inhibitor to constitute 2-10 wt % for mass of the topcoat film, the undercoat film, and/or the silver mirror film layer, respectively,
wherein the polar group includes an OH group or an NH$_2$ group, a resin in the undercoat film and the topcoat film is selected from the group consisting of a silicone resin film and an acrylic silicone resin film, and the topcoat film contains the same resin as the undercoat film.
2. The surface decoration structure according to claim 1, wherein
the aliphatic hydrocarbon compound including no aromatic compound includes at least one member selected from the group consisting of n-hexane, n-heptane, cyclohexane, and ethylcyclohexane.
3. The surface decoration structure according to claim 1, wherein the substrate is selected from the group consisting of aluminum (Al), iron (Fe), magnesium (Mg), titanium (Ti), and alloys thereof.
4. A method of forming the surface decoration structure according to claim 1, the method comprising:
forming the undercoat film by spray-painting the surface of the substrate with an undercoat and drying the undercoat;
forming the silver minor film layer by spray-painting the substrate having the undercoat film thereon with the composition liquid and drying the liquid at room temperature or under heat; and
forming the topcoat film by spray-painting a surface of the silver minor film layer with a topcoat including the solvent and drying the topcoat.
5. The surface decoration structure forming method according to claim 4, wherein the aliphatic hydrocarbon compound including no aromatic compound includes at least one member selected from the group consisting of n-hexane, n-heptane, cyclohexane, and ethylcyclohexane.

6. A surface decoration structure including an undercoat film, a silver mirror film layer, and a topcoat film formed on a surface of a substrate, wherein the silver mirror film layer includes silver nanoparticles and a polymer dispersing agent, the silver nanoparticles are stacked with the polymer dispersing agent adhering to outer surfaces of the silver nanoparticles, and the silver mirror film layer is formed in a state in which the polymer dispersing agent is reticulated three-dimensionally between the silver nanoparticles of the silver minor film layer, the silver mirror film layer is formed from a composition liquid comprising the silver nanoparticles, the polymer dispersing agent, and a silver mirror film solvent, the silver mirror film solvent is a volatile solvent, the silver nanoparticles are homogeneously dispersed in the silver minor film solvent with the polymer dispersing agent attached around the silver nanoparticles in the silver mirror film layer application process, the topcoat film and the undercoat film include a resin film containing a polar group, the topcoat film and the undercoat film include a benzotriazole compound as an ultraviolet absorber to constitute 1.0-10 wt % for mass of the topcoat film and the undercoat film, respectively, and a hindered amine as a light stabilizer to constitute 0.5-4.0 wt % for mass of the topcoat film and the undercoat film, respectively, and the topcoat film, the undercoat film, and the silver mirror film layer include a triazole compound other than the benzotriazole compound, as a corrosion inhibitor to constitute 2-10 wt % for mass of the topcoat film, the undercoat film, and/or the silver minor film layer, respectively, wherein the polar group includes an OH group or an $NH_2$ group, a resin in the undercoat film and the topcoat film is selected from the group consisting of a silicone resin film and an acrylic silicone resin film, and the topcoat film contains the same resin as the undercoat film.

7. A method of forming the surface decoration structure according to claim 6, the method comprising:

forming the undercoat film by spray-painting the surface of the substrate with an undercoat and drying the undercoat;

forming the silver minor film layer by spray-painting the substrate having the undercoat film thereon with the composition liquid and drying the liquid at room temperature or under heat; and forming the topcoat film by spray-painting a surface of the silver minor film layer with a topcoat and drying the topcoat.

* * * * *